Patented July 17, 1934

1,966,853

UNITED STATES PATENT OFFICE 1,966,853

MANUFACTURE OF MALEIC ANHYDRIDE FROM CRUDE MALEIC ACID

Michael N. Dvornikoff, St. Louis, Mo., assignor to Monsanto Chemical Company, St. Louis, Mo., a corporation of Delaware No Drawing. Application February 3, 1934, Serial No. 709,590

2 Claims. (Cl. 202—52)

This invention relates to the manufacture of maleic anhydride from crude maleic acid and it has as its principal object the provision of a method of purifying conveniently, economically and without substantial by-product formation, crude maleic acid such, for example, as is obtained by the oxidation of benzene or as a by-product of the manufacture of phthalic anhydride by the Gibbs-Conover process (United States Patent #1,285,117) and the simultaneous conversion of the acid thus obtained to anhydride.

This application is a continuation-in-part of my copending application S. N. 514,711, filed February 9, 1931, which in turn is a continuation-in-part of my copending application S. N. 439,263, filed March 26, 1930.

It is well known that maleic acid undergoes inter-molecular rearrangement forming fumaric acid when it is exposed to an elevated temperature. This phenomena interferes with the ordinary distillation of maleic acid, particularly crude maleic acid which contains organic and inorganic impurities. In an effort to distill maleic acid (probably in the form of its anhydride and water vapor) rapidly from the zone of heating at as low a temperature as possible and thereby reduce fumaric acid formation, I have tried to distill maleic acid under as greatly reduced pressure as possible with the result that a small amount of maleic acid, largely in the form of maleic anhydride with water, passes directly from solid to vapor phase. The fact that the remaining material is in a dry condition impairs the heat transfer, exposes the acid to prolonged high temperature, promotes local overheating and renders the process of no practical value.

To overcome these disadvantages, it has been proposed (United States Patent #1,424,138) that maleic acid be distilled in the presence of an inert non-aqueous liquid medium whereby the water distils off as formed with the inert liquid, leaving the anhydride dissolved or suspended, after which it is separated therefrom by distillation. This process suffers the inconveniences of relatively large quantities of a foreign constituent as well as the need of extensive equipment for the refining of a comparatively small output of product.

In my copending application, S. N. 514,711, I have disclosed and claimed a method of refining maleic acid by distillation in the absence of an organic solvent whereby a good recovery of pure maleic acid may be had without substantial formation of fumaric acid. This result is attained by controlling the temperature and pressure conditions of distillation whereby a liquid phase is at all times maintained in the still. The operation may be a continuous, semi-continuous or strictly batch process, one characteristic of all being the presence of the liquid phase in the still during the distillation.

The maintenance of the liquid phase is dependent upon a number of factors, notably the temperature within the vessel, the capacity of the equipment to transfer heat from the source thereof into the charge, the pressure within the vessel, the quantity and nature of the impurities in the crude maleic acid and other factors.

With practice, the liquid phase can be maintained without difficulty. In general, other conditions being favorable, the temperature should be maintained as low as possible while maintaining the presence of a liquid phase in an amount sufficient to gain the advantage of a heat transfer from the wall of the vessel to the solid maleic acid through a liquid phase rather than directly from the vessel to the solid acid.

With most types of crude acid, both extremes in temperature as well as pressures are to be avoided. Thus, even when heating the vessel vigorously, it is possible to reduce the pressure sufficiently to effect total disappearance of the liquid phase, notwithstanding the fact that there is at all times an excess of maleic acid in solid phase. After the liquid phase has once disappeared, the heat transfer to the solid material is reduced to such an extent that local overheating and the formation of fumaric acid exceeds the bounds of commercial practicability. Facilities and conditions for improving the rate of heat transfer from the vessel to the charge, including adequate agitating means, large exposed heating surface, as well as others known to those skilled in the art, are to be favored. Various pressure and temperature conditions will be found operative, depending in each instance to some extent upon the purity of the product being treated, the nature of the equipment, etc.

When the vapors resulting from the distillation are condensed in a single receiving vessel one obtains a pure maleic acid product. It is probable, as pointed out in my copending application, that the vapor mixture which is condensed consists of water vapor and vapors of maleic anhydride and that the anhydride combines with the water condensate to form maleic acid.

According to the present invention, maleic anhydride is obtained, usually in admixture with a small amount of maleic acid, by effecting the distillation while at the same time fractionating the vapors whereby the water is eliminated preferentially from the charge during the initial stages of the distillation leaving a charge which is enriched progressively in maleic anhydride. As the distillation proceeds the vapors entering the fractionating column become richer in anhydride and by cutting the distillate during the course of the distillation it is possible to obtain a pure fraction which is rich in maleic anhydride, the remainder being maleic acid. The proportion of acid and anhydride in the product will depend upon the efficiency and extent of the fractionation. The safeguards against fumaric acid formation should be observed as in the case of a single distillation in which comparatively less fractionation occurs, particularly during the early stages of the distillation when water more or less free from acid is being eliminated from the batch and the batch is rich in acid. As the distillation proceeds and the charge contains a substantial amount of maleic anhydride in admixture with maleic acid, the difficulty incident to maintenance of a liquid phase becomes increasingly less difficult. Moreover, the tendency to form fumaric acid is largely obviated and the dangers of fumaric acid formation and the difficulties incident to distillation disappear as the charge undergoing distillation becomes richer in anhydride.

In actual practice, and when a pure anhydride is desired, it is advantageous to effect the distillation in two stages; the first stage being one in which a partly dehydrated acid product is obtained and the various impurities present in the crude mixture are more or less completely eliminated, the second in which the dehydration of the residual acid present in the product is completed and a pure anhydride is obtained. However, if desired and particularly if the crude product contains comparatively small amounts of impurities, the distillation of the crude product and recovery of the anhydride may be performed in a single operation.

The following examples will serve to illustrate embodiments of my invention.

*Example I.*—Maleic acid is heated to approximately 110° C. in a receptacle provided with an agitating mechanism adapted to be operated under reduced pressure conditions. As this temperature is attained, at least a portion of the acid will liquefy and the charge as a whole attains a mushy consistency. The distillation is effected through a fractionating column and under reduced pressure conditions of 50-60 mm. while maintaining the temperature of the batch and, if necessary, adjusting the pressure and temperature to maintain the liquid condition of the charge. Such adjustment will depend to a large extent upon the nature and amount of impurities present. As the water is eliminated the danger of fumaric acid formation, as well as solidification of the charge is diminished. After an amount of water is eliminated which indicates that 75% or more of the acid has been converted to anhydride, the subsequent distillate is collected in a separated receptacle and the distillation is continued until substantially all of the charge is volatilized.

*Example II.*—Proceed as set forth in Example I but first introduce an amount of maleic anhydride from a preceding batch equivalent to 20-30% of the crude product. This heel will serve as a suitable flux for the crude acids and thereby minimize the difficulties incident to the maintenance of a liquid phase during the early stages of the distillation while water is being eliminated from the system.

*Example III.*—An enamel, steam jacketed kettle, which is provided with an agitator and a reflux column, is charged with a crude material containing 85-95% maleic acid. The charge is heated by means of steam or other heating medium within the jacket, and after a liquid phase appears it is slowly agitated. If desired, only a small amount of crude acid need be added to the still until a liquid phase appears, after which additional acid is added while at the same time the agitating mechanism is operated. After all of the acid has been added, the temperature in the jacket is adjusted to that of steam at 25-30 lbs. pressure (130°-135° C.) and the pressure within the kettle is reduced to 30-50 mm. or lower if desired. If, because of the nature of the crude or the design of the equipment, a tendency toward the disappearance of the liquid phase becomes pronounced, the pressure should be increased whereby the temperature rises sufficiently to assure the maintenance of the liquid phase during the distillation. Water will be evolved during the early stages of the distillation in preponderance, while the charge undergoing distillation becomes proportionately richer in anhydride. After most of the water has thus been eliminated by fractionation the receiver is changed and the anhydride is collected as in the preceding example.

*Example IV.*—A distillate such as is obtained in the preceding example and which contains substantial amounts of maleic anhydride, is fractionally distilled at 20-30 mm. to eliminate substantially all of the combined water, which is present in the form of maleic acid, until the acid is converted substantially completely to anhydride, after which the receiver for the distillate is changed and a maleic anhydride product containing better than 98% maleic anhydride is recovered.

Although I have illustrated several embodiments of my invention, it is to be understood that the invention is not limited to the precise pressure and temperature conditions specified but, on the contrary, contemplates the simultaneous distillation and dehydration in the absence of a foreign organic solvent of maleic acid while maintaining a liquid phase in the still by sub-atmospheric pressure and temperature control.

What I claim is:

1. The method of obtaining a distillate rich in maleic anhydride from crude maleic acid, said distillate being essentially free from impurities present in the crude maleic acid, that comprises fractionally distilling the crude maleic acid gradually to drive off the combined water from the acid to form maleic anhydride while retaining the unconverted acid, the distillation being effected in the absence of an organic solvent and in the absence of a chemical dehydrating agent at a temperature not substantially in excess of 135 degrees centigrade and under sub-atmospheric pressure conditions while maintaining a liquid phase of the charge in the still by sub-atmospheric pressure and temperature control, the fractional distillation being continued until a substantial amount of the acid has been converted into the anhydride and a corresponding amount of combined water has been eliminated, continuing the distillation to drive off the fraction rich in maleic anhydride and collecting this fraction separately from the initial fraction rich in water.

2. The method of obtaining a distillate rich in maleic anhydride from crude maleic acid, said distillate being essentially free from impurities present in the crude maleic acid, that comprises fractionally distilling the crude maleic acid gradually to drive off the combined water from the acid to form maleic anhydride while retaining the unconverted acid, the distillation being effected in the absence of an organic solvent and in the absence of a chemical dehydrating agent at a temperature not substantially in excess of 135 degrees centigrade and under sub-atmospheric pressure conditions not substantially in excess of 60 mm. while maintaining a liquid phase of the charge in the still by sub-atmospheric pressure and temperature control, the fractional distillation being continued until substantially all of the combined water has been eliminated, continuing the distillation to drive off the fraction rich in maleic anhydride and collecting this fraction separately from the initial fraction rich in water.

MICHAEL N. DVORNIKOFF.